July 27, 1965 C. T. GRAVES 3,197,061
COVERS AND SEALS FOR MANWAY STRUCTURES FOR TANKS
Filed Sept. 10, 1963 2 Sheets-Sheet 2
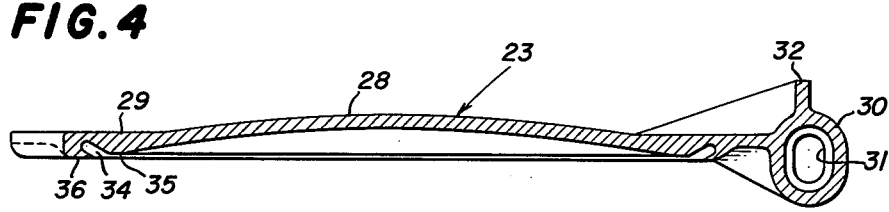
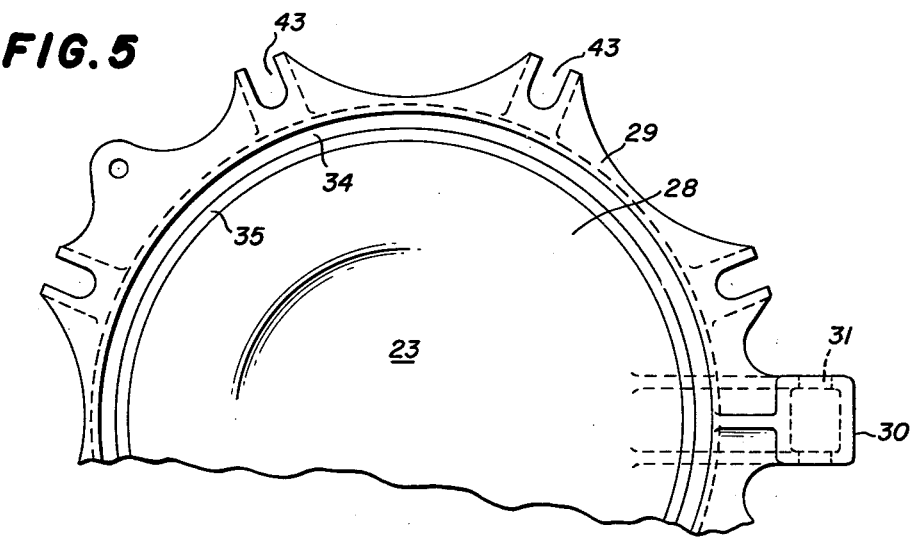
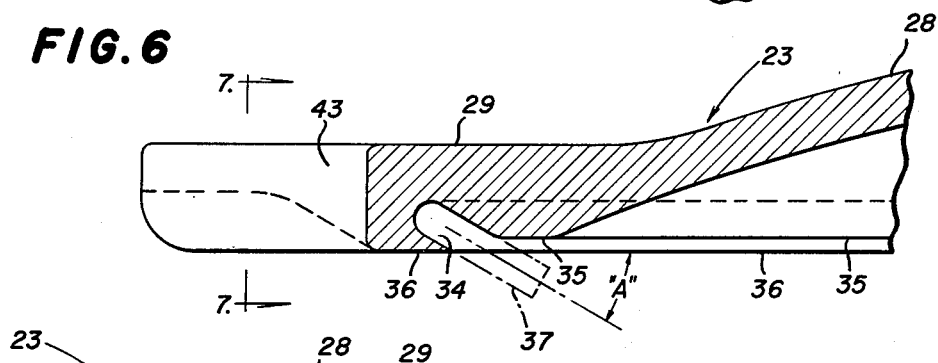
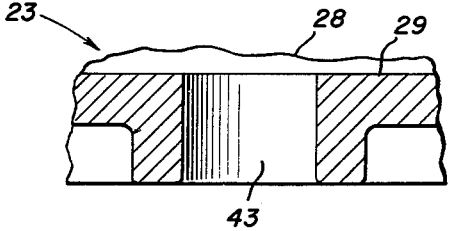
INVENTOR.
CHARLES T. GRAVES
BY
Prangley, Baird, Clayton,
Miller & Vogel
ATTYS.

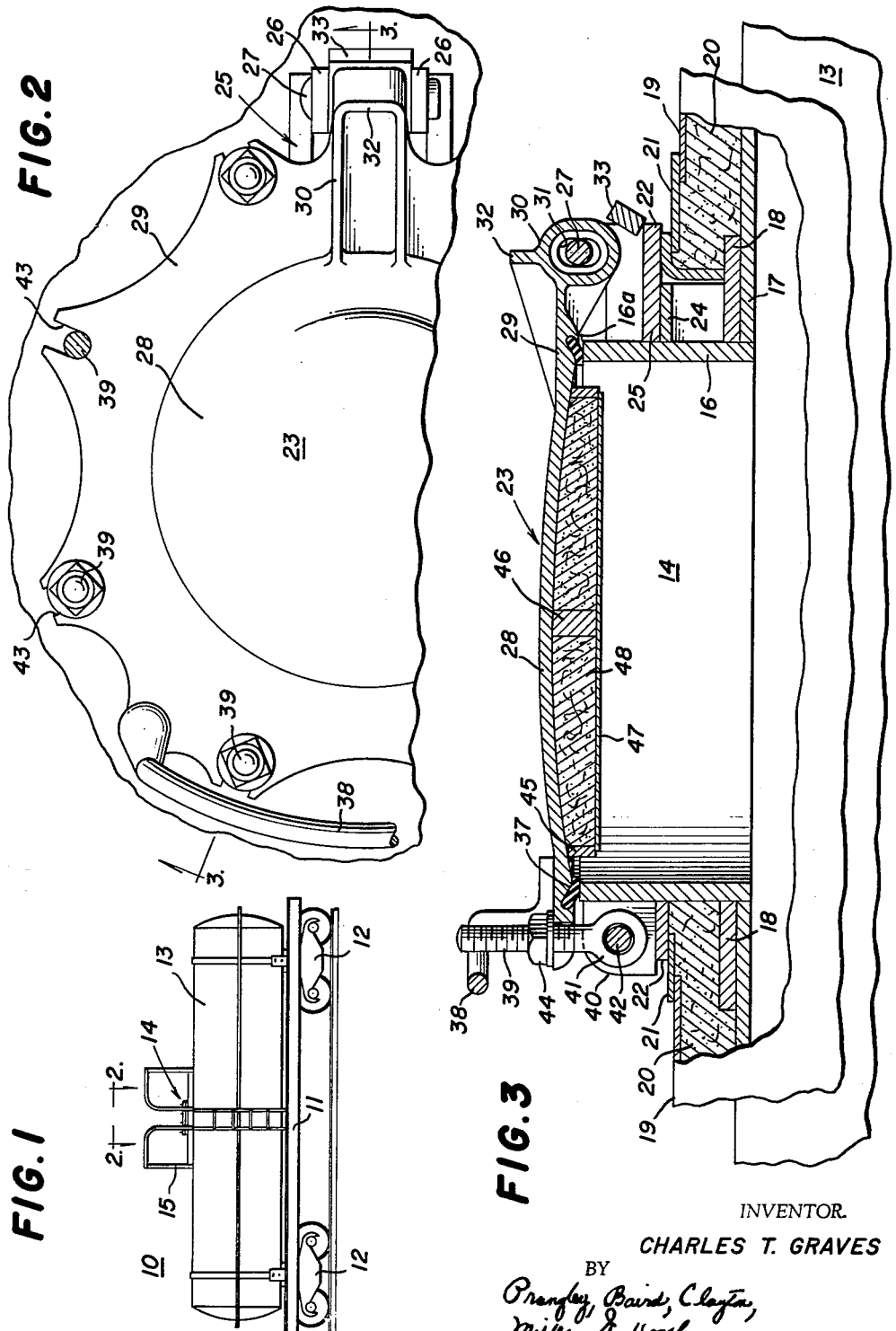

__United States Patent Office__  3,197,061
Patented July 27, 1965

3,197,061
COVERS AND SEALS FOR MANWAY STRUCTURES FOR TANKS
Charles T. Graves, Sharon, Pa., assignor to General American Transportation Corporation, Chicago, Ill., a corporation of New York
Filed Sept. 10, 1963, Ser. No. 308,015
6 Claims. (Cl. 220—46)

The present invention relates to covers and seals for manway structures for tanks, and particularly tank bodies of railway tank cars.

It is a general object of the invention to provide a sealing arrangement of improved and simplified construction between the outer end of a manway structure and a cover therefor, so as to provide an hermetic seal for the outer end of the manway extending through the manway structure when the cover occupies its closed position with respect to the outer end of the manway structure.

Another object of the invention is to provide a sealing arrangement of the character noted, wherein the outer end of the manway structure is provided with a first annular sealing surface and the inner side of the cover is provided with a second annular sealing surface, which sealing surfaces are arranged in closely spaced-apart cooperating relation when the cover occupies its closed position, wherein a narrow annular slot is also formed in the inner side of the cover and positioned in the second sealing surface and surrounding the inner annular portion thereof, wherein the axis of the slot is pitched radially outwardly at an acute angle to the second sealing surface, and including a narrow annular sealing gasket formed of flexible material and carried by the cover, the sealing gasket including an outer annular portion positioned in the slot and an inner annular portion projecting radially inwardly from the slot and overlying the inner annular portion of the second sealing surface, and wherein the inner annular portion of the sealing gasket is clamped between the inner annular portions of the first and second sealing surfaces when the cover occupies its closed position, so as hermetically to seal the outer end of the manway extending through the manway structure when the cover occupies its closed position.

A further object of the invention is to provide a sealing arrangement of the character described and further including improved heat-insulating structure carried by the inner side of the cover and surrounded by the second sealing surface for the purpose of minimizing heat flow through the cover in its closed position.

Further features of the invention pertain to the particular arrangement of the elements of the sealing structure, whereby the above-outlined and additional operating features thereof are attained.

The invention, both as to its organization and method of operation, together with further objects and advantages thereof, will best be understood by reference to the following specification, taken in connection with the accompanying drawings, in which:

FIGURE 1 is a side elevational view of a railway tank car including a hollow body carrying tubular manway structure provided with a movable cover and incorporating a sealing arrangement between the outer end of the manway structure and the inner side of the cover, and embodying the present invention.

FIG. 2 is an enlarged plan or outside view of cover in its closed position with respect to the manway structure, this view being taken in the direction of the arrows along the line 2—2 in FIG. 1;

FIG. 3 is an enlarged vertical sectional view of the cover and the manway structure, this view being taken in the direction of the arrows along the offset line 3—3 in FIG. 2;

FIG. 4 is an enlarged vertical sectional view of the cover, similar to FIG. 3, and illustrating the same prior to the application thereto of the sealing gasket;

FIG. 5 is an enlarged fragmentary bottom or inside view of the cover as shown in FIG. 4;

FIG. 6 is a further enlarged fragmentary vertical sectional view of the perimeter of the cover, similar to FIG. 4, and illustrating greater constructional detail thereof; and FIG. 7 is a further enlarged fragmentary vertical sectional view of the cover, this view being taken in the direction of the arrows along the line 7—7 in FIG. 6, and illustating in detail one of the clamping slots in the group provided about the perimeter of the cover.

Referring now to FIG. 1 of the drawings, there is illustrated a railway tank car 10 comprising a rigid underframe 11 supported adjacent to the opposite ends thereof by a pair of wheeled trucks 12 and carrying a hollow tank body 13 provided with upstanding tubular manway structure 14 adjacent to the top central portion thereof and defining a manway into the tank body 13 in the usual manner. Also, the tank body 13 carries a circular platform 15 surrounding the manway structure 14; which platform 15 is preferably of the construction and arrangement of that disclosed in U.S. Patent No. 3,084,638, granted on April 9, 1963, to Joseph W. Allegrette.

As best shown in FIGS. 2 and 3, the manway structure 14, forming a part of the combination embodying the features of the present invention, essentially comprises an upstanding substantially cylindrical tube 16 projecting at the lower end thereof into a cooperating opening provided in the top central portion of the substantially horizontally disposed cylindrical hollow shell 17 of the tank body 13. A substantially annular saddle collar 18 is rigidly secured to the lower end of the tube 16 and engages the adjacent cylindrical surface of the shell 17, the saddle collar 18 being rigidly secured to the shell 17 to provide a strong, unitary construction. Thus, the tube 16 defines a manway therethrough between the exterior and the interior of the shell 17 for the usual purpose; and such manway conventionally has a diameter of about 18".

As illustrated, the tank body 13 is heat-insulated; whereby the shell 17 is enclosed by an outer casing 19 to define a space therebetween that contains a layer of a suitable heat-insulating material 20. The tube 16 projects upwardly through an opening provided in the top central portion of the casing 19; and the joint between the tube 16 and the casing 19 is suitably flashed to render the same water-tight, this flashing including a substantially annular saddle collar 21 secured to the adjacent portion of the casing 19 and a substantially annular saddle collar 22 secured to the adjacent portion of the tube 16, the two collars 21 and 22 being suitably secured together to complete the flashing mentioned.

Also, a substantially disk-shaped cover 23 is operatively associated with the upper or outer end of the tube 16; and specifically, as best shown in FIGS. 2 and 3, a section of the collar 18 disposed in a vertical plane passing through the longitudinal center line of the shell 17 carries a substantially inverted U-shaped fixture 24 rigidly secured thereto, to which a hinge element 25 is rigidly secured; which hinge element 25 comprises a pair of spaced-apart upstanding arms 26, between which a pintle 27 is secured in place.

Preferably, the cover 23 comprises a one-piece metal casting and includes a centrally disposed and upwardly domed section 28 and provided with a substantially flat annular rim section 29, as best shown in FIGS. 4 to 7, inclusive. One portion of the rim section 29 carries an upstanding and radially outwardly directed hinge part 30 formed integrally therewith; which hinge part 30 has an opening 31 extending therethrough. Specifically, the cover 23 is mounted upon the upper end of the tube 16 by the hinge element 25, the hinge part 30 and the pintle 27; whereby the cover 23 is seslectively movable between closed and open positions with respect to the upper end of the tube 16. More particularly, the hinge part 30 is arranged between the legs 26 of the hinge element 25 with the pintle 27 extending through the opening 31 formed in the hinge part 30. In the arrangement, the opening 31 formed in the hinge part 30 is elongated somewhat in the vertical direction to accommodate rocking of the cover 23 into its fully closed position about the adjacent edge of the upper end of the tube 16 incident to movement of the cover 23 from its open position. Also, the top of the hinge part 30 carries a stop 32 that cooperates with a stop 33 carried by the hinge element 25 so as positively to establish the fully open position of the cover 23, without the cover 23 striking the adjacent top portion of the casing 19.

Referring now to FIGS. 3, 4 and 6, a narrow annular slot 34 is formed in the lower surface of the annular rim section 29 of the cover 23; which annular slot 34 is disposed radially outwardly from the dome section 28 and radially inwardly from the perimeter of the rim section 29, so as to define a flat annular inner sealing surface 35 disposed radially inwardly of the annular slot 34 and a flat annular outer sealing surface 36 disposed radially outwardly of the annular slot 34; and the axis of the annular slot 34 is pitched radially upwardly and outwardly from the annular surface 36 to define an acute angle therebetween, as indicated at "A" in FIG. 6; which acute angle "A" may be approximately 30°. Also, it is noted that the flat annular inner surface 35 is disposed in an upper plane, while the flat annular outer surface 36 is disposed in a lower plane; which planes may be displaced from each other by approximately 3/32". The extreme top end of the tube 16 constitutes a substantially horizontal flat annular sealing surface, designated 16a in FIG. 3.

Arranged in the narrow annular slot 34 is a narrow flexible annular sealing gasket 37 formed of rubber or other suitable material. Specifically, the sealing gasket 37 may be formed of neoprene, or asbestos containing flexible wire or other supporting structure. More particularly, the outer annular portion of the sealing gasket 37 is disposed within the slot 34, while the inner annular portion of the sealing gasket 37 projects downwardly and radially inwardly out of the slot 34 and into underlying position with respect to the annular inner surface 35, as indicated in FIG. 6. In the arrangement, the sealing gasket 37 may be retained in place in the slot 34 entirely by the frictional fit between the annular outer portion of the gasket 37 and the adjacent engaging walls of the slot 34.

When the cover 23 is moved into its closed position, as illustrated in FIG. 3, the annular inner portion of the sealing gasket 37 is compressed between the annular inner sealing surface 35 of the cover 23 and the adjacent sealing surface 16a of the tube 16, thereby hermetically to seal the outer end of the manway extending through the tube 16 into the tank shell 17. When the cover 23 is moved out of its closed position, the annular inner portion of the gasket 37 flexes back into alignment with the annular outer portion thereof disposed in the slot 34, in an obvious manner. For the purpose of facilitating movement of the cover 23 between its closed and open positions, a handle 38 is carried thereby in a position disposed substantially diametrically opposite the hinge part 30, as best shown in FIGS. 2 and 3.

For the purpose of securely clamping the cover 23 in its closed position, a plurality of clamping bolts 39 are carried by the outer surface of the tube 16 in circumferentially spaced-apart relation. More particularly, a plurality of lugs 40 are disposed about the circumference of the tube 16 in spaced-apart relation and rigidly secured thereto; and the clamping bolts 39 are respectively pivotally mounted on the lugs 40. Specifically, each of the bolts 39 comprises an eye-bolt having a ring 41 at the lower end thereof through which a pin 42 extends, so as pivotally to connect the bolt 39 to the adjacent lug 40. Further, a corresponding plurality of clamping slots 43 are provided in circumferentially spaced-apart relation about the perimeter of the cover 23; which slots 43 respectively receive the bolts 39, when the bolts 39 are pivoted upwardly about the pins 42. Further, the outer ends of the bolts 39 carry clamping nuts 44 that are adapted to be tightened into engagements with the portions of the rim section 29 immediately adjacent to the respective slots 43.

The arrangement of the gasket 37 in the slot 34 is very advantageous, since an increase in pressure in the tank shell 17 causes the gasket 37 to be forced with greater pressure upwardly and radially outwardly into the slot 34, so as to increase the frictional engagement between the annular outer portion of the gasket 37 and the boundary walls of the slot 34, with the result that the quality of the hermetic seal between the upper end of the tube 16 and the cover 23 is improved. Thus, there is no danger of failure of the gasket 37 by an increase in pressure within the tank shell 17.

As previously noted, the tank body 13 is heat-insulated; whereby the cover 23 is also heat-insulated. Specifically, the inner surface of the dome section 28 of the cover 23 is completely smooth and of concave form, as clearly shown in FIG. 3. A ring 45 is secured to the inner side of the dome section 28 in a position disposed radially inwardly of the rim section 29; and a post 46 is carried by the inner side of dome section 28 adjacent to the center thereof; which elements 45 and 46 project well below the upper end of the tube 16, when the cover 23 occupies its closed position, as illustrated in FIG. 3. Also, a substantially disk-like sheet 47 is secured to the lowermost portions of the elements 45 and 46, so as to define a chamber disposed below the inner side of the dome section 28 of the cover 23; which chamber contains a body 48 of a suitable heat-insulating material.

In view of the foregoing it is apparent that there has been provided in a tank, including a hollow body and tubular manway structure carried by the body and projecting outwardly therefrom and defining a manway extending therethrough into the body, an improved cover and sealing arrangement for the outer end of the manway structure that is of simple and economical construction and arrangement and that positively insures hermetic sealing of the outer end of the manway when the cover is moved into its closed position with respect to the outer end of the manway structure.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a tank including a hollow body, tubular manway structure carried by said body and projecting outwardly therefrom and defining a manway extending through into said body, the outer end of said manway structure terminating in a first flat annular sealing surface surrounding the outer end of the manway extending therethrough, a cover carried by said manway structure and mounted thereon for hinged movements between closed and open positions with respect to the outer end of said manway structure, the inner side of said cover being provided with a second annular sealing surface disposed radially inwardly from the perimeter thereof and arranged in cooperating position with said first sealing surface when said cover occupies its closed position, said second sealing surface being stepped and including concentric and adjacent outer and inner flat annular portions, the outer annular portion of said second sealing surface in its cooperating position being disposed substantially parallel to said first sealing surface and spaced closely adjacent thereto and outwardly a first distance therefrom, the inner annular portion of said second sealing surface in its cooperating position being disposed substantially parallel to said first sealing surface and spaced closely adjacent thereto and outwardly a second distance therefrom, wherein said second distance is greater than said first distance, the inner side of said cover also having a narrow annular slot formed therein and positioned at the boundary between the outer and inner annular portions of said second sealing surface and surrounding the inner portion of said second sealing surface, the axis of said slot being pitched radially outwardly at an acute angle to the inner portion of said second sealing surface, and a narrow annular sealing gasket formed of flexible material and carried by said cover, said sealing gasket including an outer annular portion positioned in said slot and an inner annular portion projecting radially inwardly from said slot and underlying the inner annular portion of said second sealing surface, the inner annular portion of said sealing gasket being clamped between the inner annular portions of said first and second sealing surfaces when said cover occupies its closed position, thereby hermetically to seal the outer end of the manway extending through said manway structure when said cover occupies its closed position.

2. The tank combination set forth in claim 1, wherein said sealing gasket is retained in place on said cover entirely by a frictional fit between the outer annular portion thereof and the walls of said slot formed in said cover.

3. The tank combination set forth in claim 1, wherein the central portion of said cover surrounded by the inner annular portion of said second sealing surface is domed outwardly therefrom to define a corresponding cavity in the inner side of the central portion of said cover.

4. The tank combination set forth in claim 1, and further comprising a plurality of clamping devices disposed in circumferentially spaced-apart relation about said manway structure and about the perimeter of said cover for locking in place said cover in its closed position, each of said devices including first and second cooperating elements respectively secured to said manway structure and to said cover.

5. The tank combination set forth in claim 1, and further comprising a plurality of clamping bolts disposed in circumferentially spaced-apart relation about said manway structure and pivotally mounted thereon for movements between active and inactive positions with respect to said cover in its closed position, said cover having a corresponding plurality of clamping slots disposed in corresponding circumferentially spaced-apart relation about the perimeter thereof, wherein said clamping slots are adapted respectively to receive said clamping bolts when said cover occupies its closed position and said clamping bolts occupy their active positions, and a corresponding plurality of clamping nuts respectively carried by said clamping bolts, each of said clamping nuts being adapted to be run selectively into clamping and release positions with respect to the adjacent portion of said cover in its closed position when the associated one of said clamping bolts occupies its active position in the associated one of said clamping slots.

6. The tank combination set forth in claim 1, and further comprising an annular ring carried by the inner side of said cover and surrounding the central portion thereof and located radially inwardly of said second sealing surface, said annular ring being movable with said cover through the outer end of said manway structure and projecting inwardly into the outer end of said manway structure when said cover occupies its closed position, a substantially disk-like end sheet closing the open end of said ring and defining a chamber within said ring positioned between said end sheet and the adjacent central portion of said cover, and a body of heat-insulating material arranged in said chamber and substantially completely filling the same so as to limit the transmission of heat from the exterior through said cover into said manway.

References Cited by the Examiner

UNITED STATES PATENTS

| 1,017,451 | 2/12 | Norton et al. | 220—46 |
| 1,389,542 | 8/21 | Wereley | 220—46 |
| 1,683,345 | 9/28 | Geyer | 220—46 |
| 2,176,367 | 10/39 | Strough | 220—85 |
| 2,395,602 | 2/46 | Wittenberg | 220—46 |
| 2,873,043 | 2/59 | Folmsbee | 220—46 |

FOREIGN PATENTS

| 142,951 | 8/51 | Australia. |
| 1,104,699 | 11/55 | France. |

THERON E. CONDON, *Primary Examiner.*

GEORGE O. RALSTON, *Examiner.*